United States Patent
McQueen et al.

(10) Patent No.: US 9,581,275 B2
(45) Date of Patent: Feb. 28, 2017

(54) HOSES PRINCIPALLY FOR AUTOMATIC SWIMMING POOL CLEANERS

(75) Inventors: E. Keith McQueen, Thousand Oaks, CA (US); Emmanuel Mastio, East Lindfield (AU); Dindo Uy, North Hollywood, CA (US); Mark J. Bauckman, Carlsbad, CA (US)

(73) Assignee: ZODIAC POOL SYSTEMS, INC., Vista, CA (US)

( * ) Notice: Subject to any disclaimer, the term of this patent is extended or adjusted under 35 U.S.C. 154(b) by 1020 days.

(21) Appl. No.: 13/400,632

(22) Filed: Feb. 21, 2012

(65) Prior Publication Data

US 2012/0211995 A1    Aug. 23, 2012

Related U.S. Application Data

(60) Provisional application No. 61/445,138, filed on Feb. 22, 2011.

(51) Int. Cl.
| | |
|---|---|
| *H02P 9/04* | (2006.01) |
| *F16L 51/02* | (2006.01) |
| *F16L 11/118* | (2006.01) |
| *E04H 4/16* | (2006.01) |
| *E21B 41/00* | (2006.01) |
| *H02N 2/18* | (2006.01) |
| *E21B 28/00* | (2006.01) |

(52) U.S. Cl.
CPC .......... *F16L 51/025* (2013.01); *E04H 4/1672* (2013.01); *F16L 11/1185* (2013.01); *E21B 28/00* (2013.01); *E21B 41/0085* (2013.01); *H02N 2/18* (2013.01); *H02N 2/185* (2013.01)

(58) Field of Classification Search
CPC ....... E21B 28/00; E21B 41/0085; H02N 2/18; H02N 2/185
USPC ...................................... 290/1 R
See application file for complete search history.

(56) References Cited

U.S. PATENT DOCUMENTS

| | | | |
|---|---|---|---|
| 2,713,381 A | 7/1955 | Seck | |
| 5,348,051 A | 9/1994 | Kallenbach | |
| 6,768,214 B2 * | 7/2004 | Schultz et al. | 290/1 R |
| 7,145,074 B2 | 12/2006 | Henkin et al. | |
| 7,148,583 B1 * | 12/2006 | Shau et al. | 290/1 R |

(Continued)

FOREIGN PATENT DOCUMENTS

| | | | |
|---|---|---|---|
| GB | 974670 A | | 11/1964 |
| GB | WO 98/09339 | * | 3/1998 |

OTHER PUBLICATIONS

Communication Relating to the Results of the Partial International Search dated May 2, 2012 in Application No. PCT/US2012/025840.

(Continued)

*Primary Examiner* — Tho D Ta
(74) *Attorney, Agent, or Firm* — Dean W. Russell; Kilpatrick Townsend & Stockton LLP (57) ABSTRACT

Creating and utilizing electricity and radiation via actions of hoses is detailed. Likewise described is using electricity to heat the hoses and radiation to sanitize fluid such as water of a pool or spa. Electricity may be generated by pulsation of the hoses when employed together with a water-interruption type of automatic pool cleaner, for example. Hoses alternatively or additionally may include chemicals or materials reactive to light or other radiation.

11 Claims, 7 Drawing Sheets

(56) References Cited

U.S. PATENT DOCUMENTS

| | | | |
|---|---|---|---|
| 7,679,205 B1* | 3/2010 | Burns | 290/1 R |
| 2007/0107766 A1* | 5/2007 | Langley et al. | 136/243 |
| 2009/0077759 A1* | 3/2009 | van der Meijden et al. | 15/1.7 |

OTHER PUBLICATIONS

International Preliminary Report on Patentability dated Sep. 6, 2013 in Application No. PCT/US2012/025840.
International Search Report and Written Opinion dated Jun. 22, 2012 in Application No. PCT/US2012/025840.

* cited by examiner

HOSES PRINCIPALLY FOR AUTOMATIC SWIMMING POOL CLEANERS

CROSS-REFERENCE TO RELATED APPLICATION

This application claims the benefit of and priority to U.S. Provisional Patent Application Ser. No. 61/445,138, filed Feb. 22, 2011, the entire contents of which are hereby incorporated by this reference.

FIELD OF THE INVENTION

This invention relates to hoses principally, but not necessarily exclusively, used with automatic swimming pool cleaners (APCs) and more particularly to hoses from which electricity or radiation may either be generated or used for heating or sanitization (or both generated and used).

BACKGROUND OF THE INVENTION

U.S. Pat. No. 5,348,051 to Kallenbach describes an exemplary flexible hose for use with APCs. The hose may be molded of plastic material and have "a corrugated longitudinal cross-section to provide radial stiffness to the hose with flexibility both along and transverse to the axis of the hose." See Kallenbach, col. 1, 11. 22-25. The Kallenbach patent recognizes the forces under which the hose is placed during use with a suction-type APC, noting that the reduced pressure to which the interior of the hose is subjected tends to collapse thinner walls of the hose.

U.S. Patent Application Publication No. 2009/0077759 of van der Meijden, et al., discloses additional types of hoses principally for APCs. Contemplated in the van der Meijden application is that the hoses may be used with water-interruption APCs, in which a valve cyclically interrupts flow of water though a suction-type cleaner. The cyclical interruption "may exert forces on a flexible hose section that causes it to cyclically compress and extend along its longitudinal axis." See van der Meijden, p. 1, ¶0004. Previously, however, the repeated compression and extension of the hose has been considered (at least somewhat) in a negative manner, in that it may cause undesirable wear and failure of the hose. See id.

U.S. Pat. No. 7,145,074 to Henkin, et al., details additional hoses designed mainly to avoid coiling or knotting in use. The hoses alternate axially flexible and axially stiff sections, with the lateral forces to which the stiff sections are subjected "creat[ing] additional tension on the conduit[s] tending to pull [them] straight to unwind coils and twists therein." See Henkin, col. 6, 11. 1-32.

The contents of the Kallenbach and Henkin patents and of the van der Meijden application are incorporated herein in their entireties by this reference. None of these patents or applications, however, addresses the possibility of creating electricity or radiation via actions of hoses or using electricity to heat the hoses or radiation to sanitize pool water. All possibilities are advantageous in certain situations, though, providing need for such results.

SUMMARY OF THE INVENTION

The present inventions identify techniques and systems for accomplishing these advantageous results. For example, in one embodiment of the invention, electricity may be generated (for any possible use) from pulsation of a hose employed with a suction-type, water-interruption style of APC. Because of the conditions under which it is utilized, such hose contracts and relaxes, as noted above. Indeed, in some situations hose pulsing occurs at a rate of approximately 4-7 Hz. This cyclic motion of the hose may be used to produce electricity by, for instance, placing wires in or on the hose and magnets around the hose. As the magnets pass over the (moving) wire in the hose, electricity may be generated in conventional ways.

Alternatively, positioning of the wires and magnets may be reversed, with magnets placed in or on the hose and wires around it. Yet another alternative is to embed a shape memory wire or piezo film into corrugations of a hose. As the wire or film is bent to and fro, electricity may be generated (again in conventional manner). In another version, mechanical energy of the hose may be transformed to electrical energy by causing (or facilitating) electro-chemical reactions of chemicals within the membrane of the hose.

Hoses used with any type of APC, further, are typically exposed to sunlight, artificial light, or both. In another embodiment of the inventions, hoses are manufactured, coated, or otherwise created to include one or more chemicals reactive to light or ultraviolet (UV) or infrared (IR) radiation. The UV or IR radiation may function to sanitize (or otherwise improve one or more characteristics of) pool or spa water either passing through the hoses or adjacent thereto.

In yet another version of the inventions, electricity may be used to change the flexibility of the hose (or of a cable) used with an APC. Embedding wires in a hose or cable allows electrical current to be sent through the hose or cable, generating heat through resistance of the wires to the current. This generated heat tends to increase flexibility of the associated hose or cable, especially in colder water.

Wire may be wound into the profile of a corrugated hose, for example, to provide the medium for current flow. It instead may be extruded into a hose. Alternatively, it may be attached or connected to a hose or cable in any suitable manner. Heating a wire in a robotic floating cable may be particularly beneficial to avoid negative impact on cleaner performance. Additionally, producing electricity using actions of the hose may, in some cases, allow an APC to omit an on-board impeller conventionally used as a turbine to generate electricity. The omission in turn may open fluid flow paths within the APC, thus providing less resistance to flow of debris-laden water within the unit.

It thus is an optional, non-exclusive object of the present inventions to provide hoses whose pulsation generates electricity.

It is another optional, non-exclusive object of the present inventions to provide electricity-generating hoses in which the generated electricity is used to power devices separate from the hoses.

It is also an optional, non-exclusive object of the present inventions to provide electricity-generating hoses in which the generated electricity is used to heat the hoses to, for example, increase their flexibilities in cold weather.

It is a further optional, non-exclusive object of the present inventions to provide hoses configured to be reactive to UV or IR radiation or other components of natural or artificial light (or both).

It is an additional optional, non-exclusive object of the present inventions to provide hoses in which UV or IR radiation impinging thereon is used to sanitize, or otherwise alter at least one characteristic of, fluid passing therethrough.

DETAILED DESCRIPTION

Figure 1:
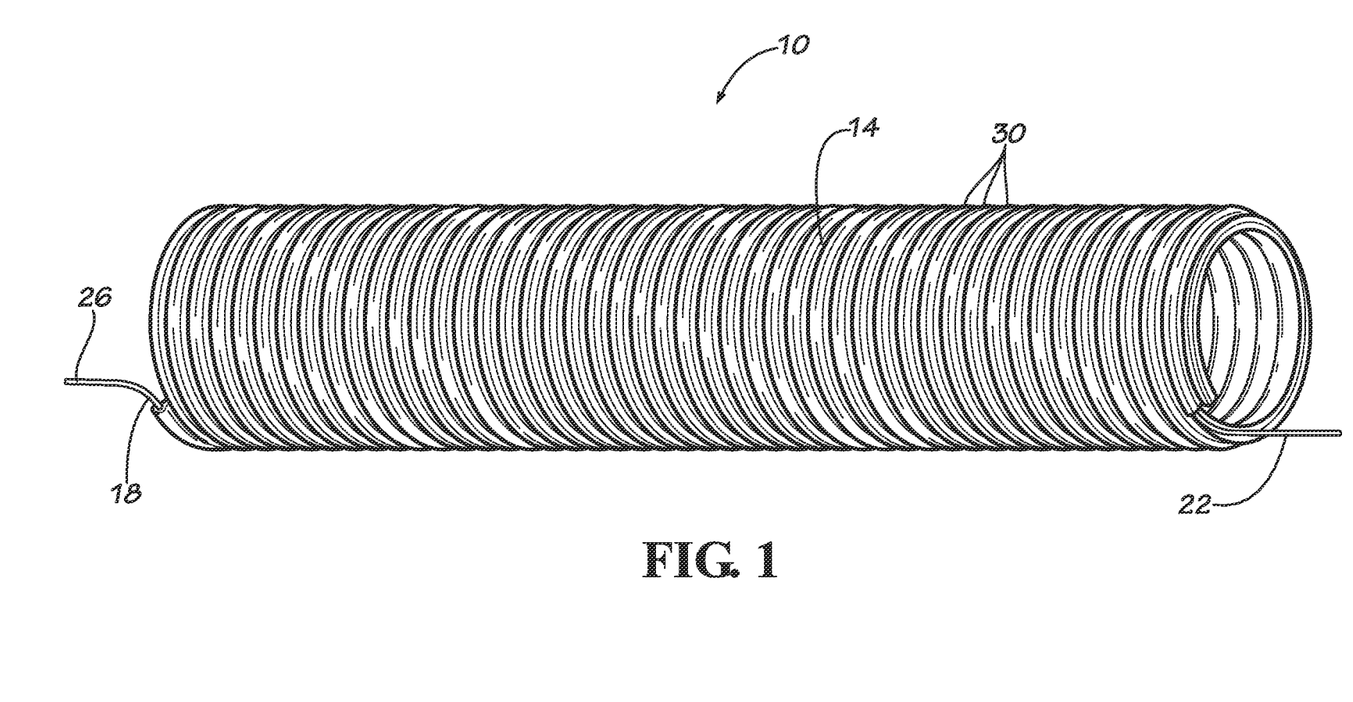
FIG. 1 is a perspective view of an exemplary hose of the present inventions.
Figure 2:
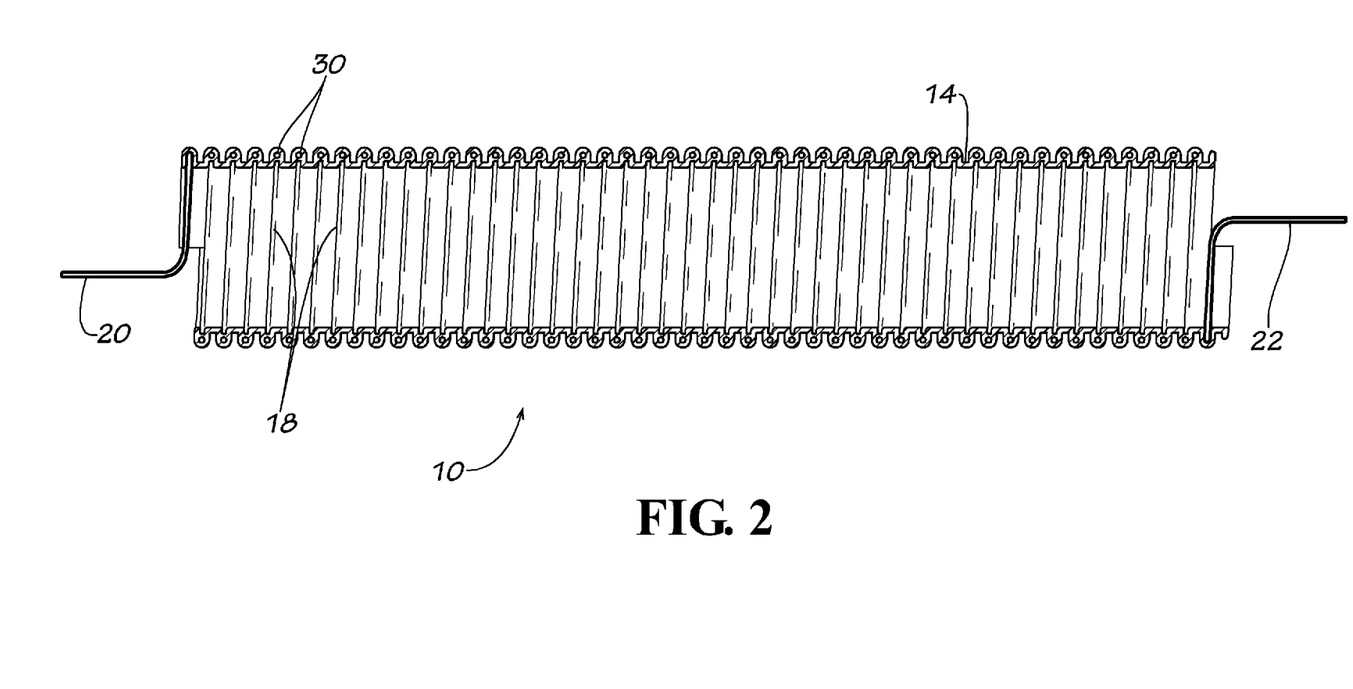
FIG. 2 is a cross-sectional view of the hose of FIG. 1.
Figure 3:
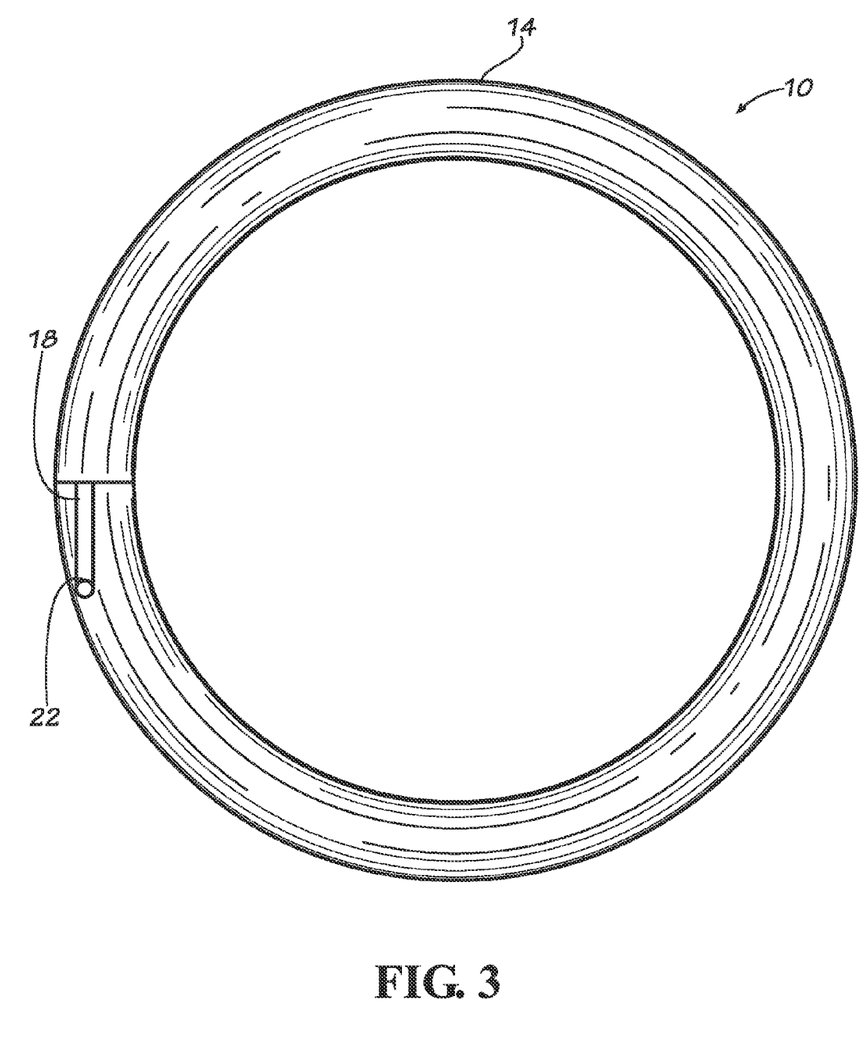
FIG. 3 is an end view of the hose of FIG. 1.

FIGS. 1-3 illustrate a section of hose 10 consistent with the present inventions. Hose 10 may be of any length and diameter suitable for its intended purpose. Hose 10 likewise may be formed in any appropriate manner and of any appropriate material. Preferably, however, hose 10 is molded of plastic and of sufficient flexibility to expand and contract longitudinally in use.

Embedded in wall 14 of hose 10 is cable or wire 18. For the segment of hose 10 illustrated in FIGS. 1-3, wire 18 is continuous through the length of the hose 10 and terminates in opposite ends 22 and 26. Wire 18 additionally may be made of metal or any other conductor of electricity. Wire 18 need not necessarily be continuous through any particular length of hose 10 if, for example, multiple (parallel) circuits are desired to be created in that length. Alternatively, conductive connectors may connect discontinuous lengths of wire 18 to provide continuous conductivity through the particular length of hose 10.

As illustrated especially in FIGS. 1-2, hose 10 may be corrugated. In such case wire 18 may beneficially be embedded in corrugations 30. Wire 18 need not necessarily be so embedded, however, and instead may be configured and connected to hose 10 in any appropriate manner. In any event, wire 18 preferably moves in some fashion as hose 10 expands and contracts in use.

In the version of hose 10 shown in FIGS. 1-3, wire 18 advantageously is piezo cable or wire. Mere expansion and compression of such wire may generate electricity, without necessity of any assembly external to hose 10. The electricity may be used to power an electrical object or device or, especially if wire 18 is shorted, to heat hose 10 to, for example, increase its flexibility.

Figure 4:
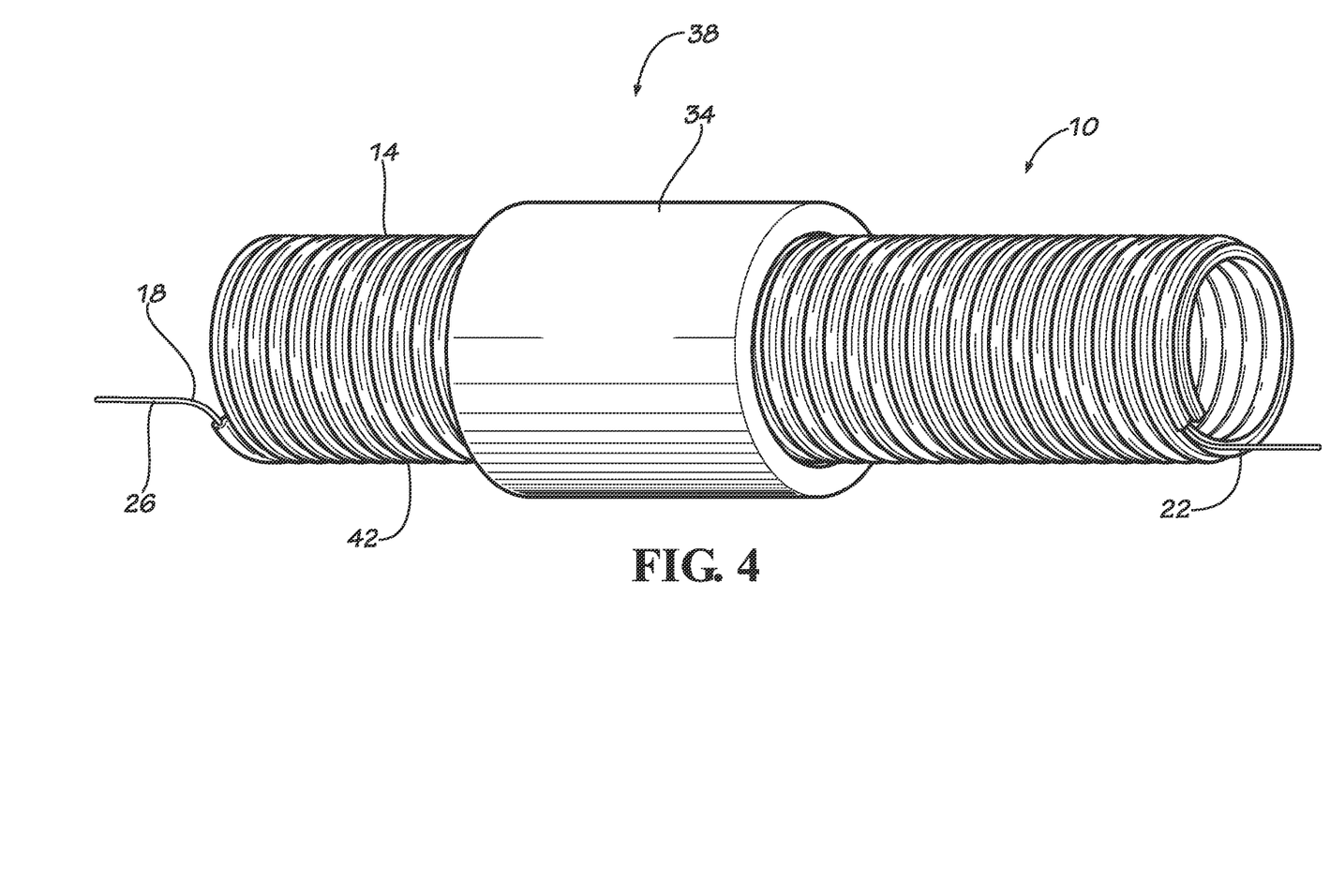
FIG. 4 is a perspective view of an alternate exemplary hose assembly of the present inventions.
Figure 5:
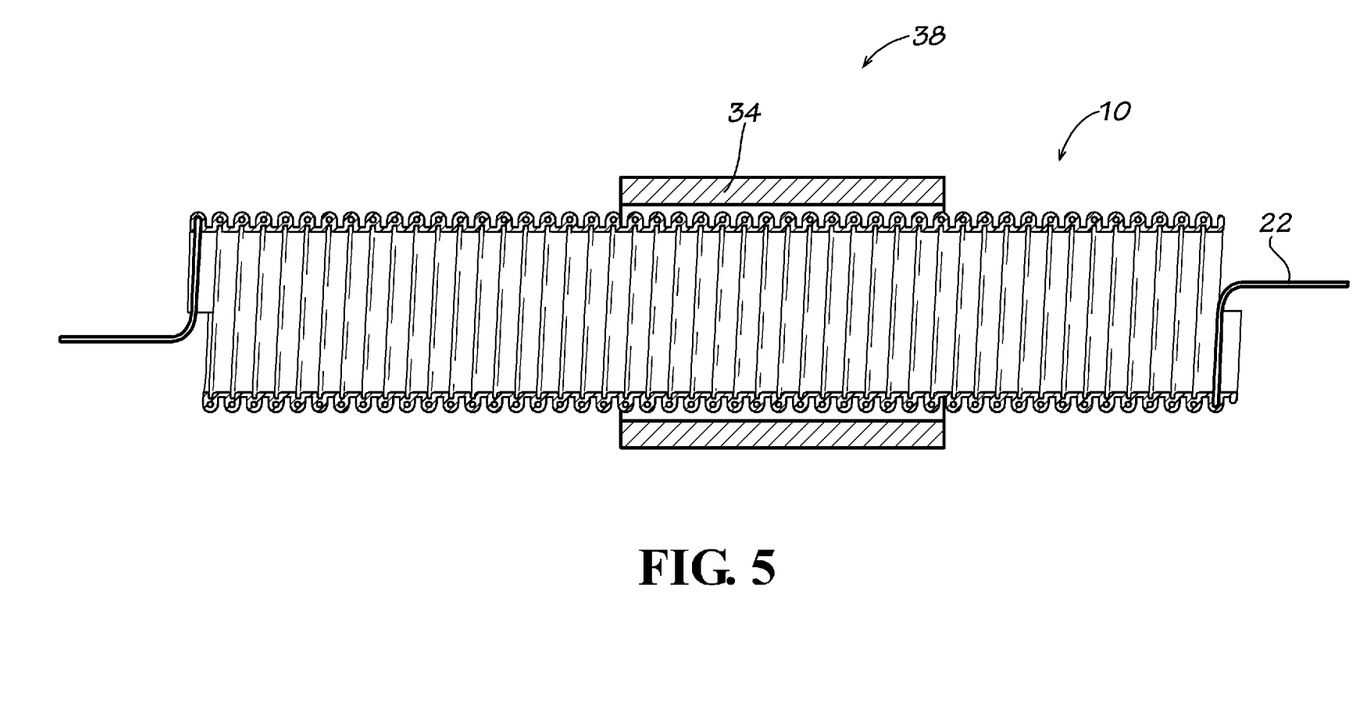
FIG. 5 is a cross-sectional view of the hose assembly of FIG. 4.
Figure 6:
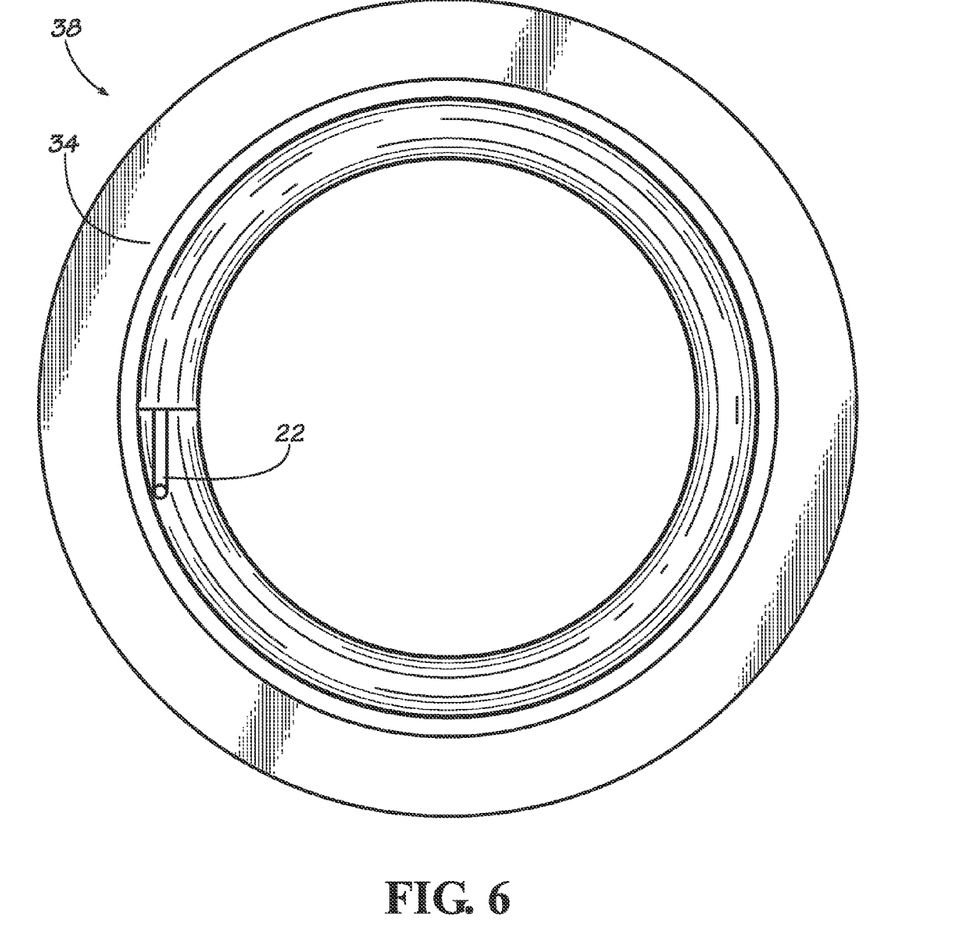
FIG. 6 is an end view of the hose assembly of FIG. 4.

FIGS. 4-6 likewise illustrate a segment of hose 10 in which electrically-conductive wire 18 may be formed in wall 14. If non-piezo cable is used as wire 18, one or more magnets 34 may be employed, with hose 10 and magnets 34 collectively comprising assembly 38. Generation of electricity thus may occur via relative movement of wire 18 and magnets 34 as hose 10 expands and contracts.

Magnets 34 are shown as being—or being housed in—a cylindrical structure that may circumscribe exterior 42 of hose 10. Magnets 34 may be fitted about wall 14 or connected thereto, albeit with some possible degradation of movement of the hose 10 in the fitted or connected area. Alternatively, stops may be formed on exterior 42 that prevent significant longitudinal movement of magnets 34 while avoiding any requirement that the magnets 34 be connected to hose 10. Persons skilled in appropriate fields will recognize that other ways of permitting interaction between magnets 34 and wire 18 may be utilized instead.

Hose 10 beneficially may be connected (directly or indirectly) between a pump inlet and a suction-type, water-interruption style APC. Periodic interruption of water flow through the APC results in contraction of hose 10; when flow through the APC is not interrupted, hose 10 may expand. The result is pulsing of the hose, typically (although not necessarily) at a rate of approximately 4-7 Hz.

Figure 7:
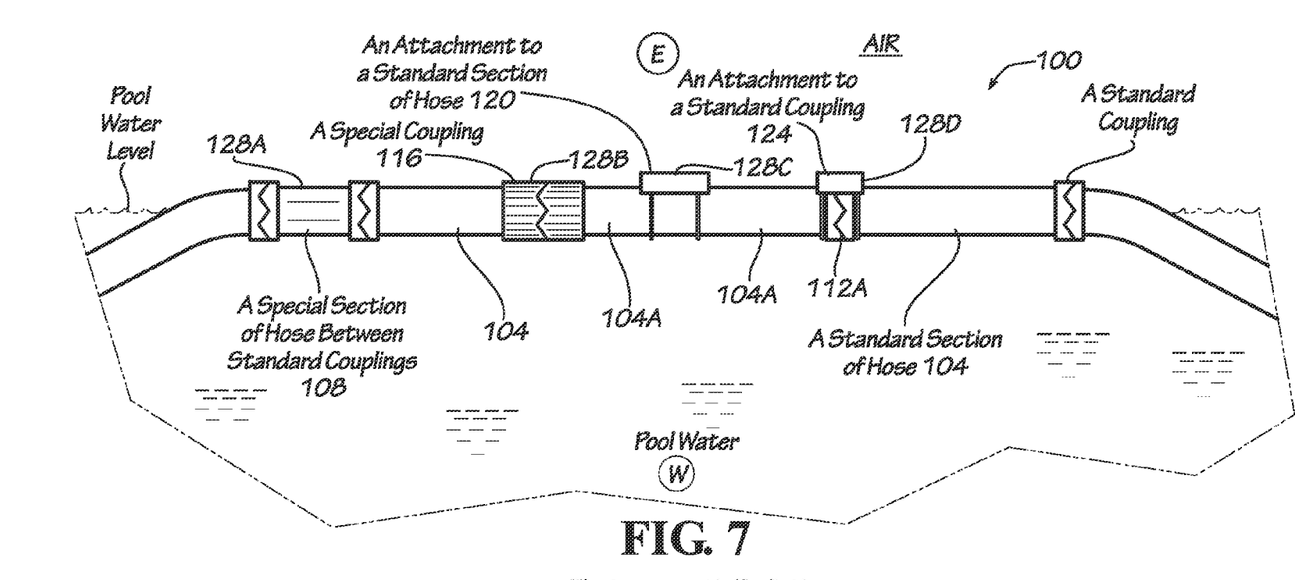
FIG. 7 illustrates a length of an exemplary hose assembly which may be used to change one or more characteristics of water contacting or adjacent the assembly.
Figure 8:
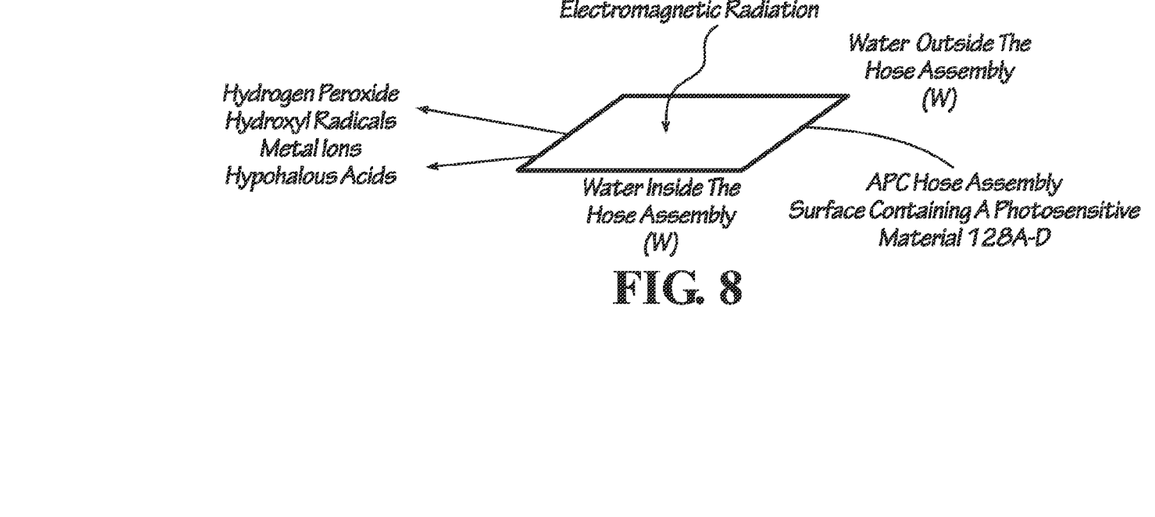
FIG. 8 is a schematicized diagram of certain features of the hose assembly of FIG. 7.

FIG. 7 shows exemplary hose assembly 100 also consistent with the present inventions. As depicted, assembly 100 includes multiple standard hose sections 104 as well as non-standard hose section 108. Similarly, the illustrated assembly 100 includes standard couplings 112 and a non-standard coupling 116. Yet additionally, FIG. 7 illustrates attachment 120 to hose section 104A and attachment 124 to coupling 112A. Some or all of sections 108, couplings 116, and attachments 120 and 124 may be omitted from any particular hose assembly 100, as they illustrate various manners of providing an assembly reactive to radiation of natural or artificial light. Alternatively, all of sections 108, couplings 116, and attachments 120 and 124 may be included in a particular hose assembly 100 if desired.

FIG. 7 additionally depicts hose assembly 100 present in a pool, with at least portions of external surfaces 128A-D of its non-standard components or attachments floating on water W so as to be exposed to the ambient environment E. As such, surfaces 128A-D are exposed to electromagnetic radiation (EMR), such as visible or UV light (or both), from natural or man-made sources (or both). Surfaces 128A-D contain photosensitive material which, when exposed to EMR, directly or indirectly stimulate a chemical response which changes a characteristic of water W in or around assembly 100. Preferably, although not necessarily, the characteristic of water W changed by assembly 100 is its sanitary quality.

In at least one version of assembly 100, a titanium-containing or $TiO_2$-containing material is coated on or impregnated into one or more of sections 108, couplings 116, or attachments 120 or 124. When the material is impinged upon by EMR (such as visible or UV light), it induces excited chemical states in nearby water W inside or outside of hose assembly 100 and generates actives species for improving water quality. For example, it may convert some of water W to hydrogen peroxide or hydroxyl radicals, or both, which are well known disinfecting agents.

Other species may be transformed via interaction with a photosensitive material, either directly or through contact with an intermediary like hydrogen peroxide or hydroxyl radicals. As an example, chloride ion in water, often present from common dissolved salts from chlorine decomposition may be transformed to hypochlorous acid (HOCl). Similarly, bromide ion can be converted to hypobromous acid (HOBr). Alternatively, metallic particles or atoms can be converted to ionic forms (e.g., silver to $Ag^+$, copper to $Cu^{2+}$, or zinc to $Zn^{2+}$) via direct or indirect contact with photosensitive material to perform bactericidal or algicidal functions.

In at least another embodiment of assembly 100, EMR may impinge on a photovoltaic material made part of the assembly 100. Voltage so produced using the material may be used to affect water quality directly or indirectly. For example, pathogens or algae present in water W that contact electrically conducting or charged surfaces can be killed or impaired. As another example, water W contacting electrically conducting or charged surfaces can be converted to active species such as hydrogen peroxide or hydroxyl radicals. Likewise, active species generated in this way can react with and oxidize other materials present in water W such as chloride, bromide, metallic silver, metallic copper, or metallic zinc to provide their respective more active forms HOCl, HOBr, $Ag^+$, $Cu^{2+}$, and $Zn^{2+}$.

Yet other versions of assembly 100 may include electrically conductive material or wiring (as, for example, does hose segment 10). Voltage generated by the photovoltaic material may be applied to the conductive material or wiring to metals containing one or more of silver, copper, or zinc. The result can be conversion of the relatively insoluble forms of the metal into the more soluble and biocidally active forms $Ag^+$, $Cu^{2+}$, or $Zn^{2+}$ as a way to improve quality of water W.

Various versions of assembly 100 may include one or more of sections 108, couplings 116, or attachments 120 or 124 having been coated with or containing thermally-sensitive material. Thermal energy produced with EMR impinges upon appropriate surfaces 128A-D, or thermal energy from air or water, the temperature of which has been elevated above that of the bulk pool water W by some natural or man-made energy source, can be transferred via thermally-conductive material directly or indirectly to water W adjacent the interior or exterior of assembly 100. One suitable thermally-conductive material is copper metal, although persons skilled in the art will recognize that other materials also may be suitable for use. As one such other example, a bar of zinc metal, directly or indirectly in thermal contact with infrared radiation (IR), will yield more zinc ions to surrounding water than will the same system in the absence of thermal contact with the IR.

The foregoing is provided for purposes of illustrating, explaining, and describing embodiments of the present inventions. Modifications and adaptations to these embodiments will be apparent to those skilled in the art and may be made without departing from the scope or spirit of the inventions.

What is claimed is:

1. A hose assembly comprising:
   a. a hose having a longitudinal axis and configured to expand and contract along the longitudinal axis under influence of a pump; and
   b. means for generating electricity from the longitudinal expansion and contraction of the hose.

2. A hose assembly according to claim 1 in which the electricity-generating means comprises electrically-conductive wire.

3. A hose assembly according to claim 2 in which the wire is piezo wire.

4. A hose assembly according to claim 2 in which the electricity-generating means further comprises at least one magnet.

5. A hose assembly according to claim 2 in which the hose is corrugated and the wire is embedded in the corrugations.

6. A system for generating electricity comprising:
   a. a pump having an inlet;
   b. an automatic swimming pool cleaner having an outlet; and
   c. a hose assembly positioned between the inlet of the pump and the outlet of the automatic swimming pool cleaner and comprising:
      i. a hose having a longitudinal axis and configured to expand and contract along the longitudinal axis under influence of the pump; and
      ii. means for generating electricity from the longitudinal expansion and contraction of the hose.

7. A system according to claim 6 in which the automatic swimming pool cleaner comprises a water-interruption valve.

8. A system according to claim 6 in which the electricity-generating means comprises electrically-conductive wire.

9. A system according to claim 8 in which the wire is piezo wire.

10. A system according to claim 8 in which the electricity-generating means further comprises at least one magnet.

11. A system according to claim 8 in which the hose is corrugated and the wire is embedded in the corrugations.

* * * * *